INVENTOR.
Russell B. Matthews
BY
Seegert & Schwalbach
Attys.

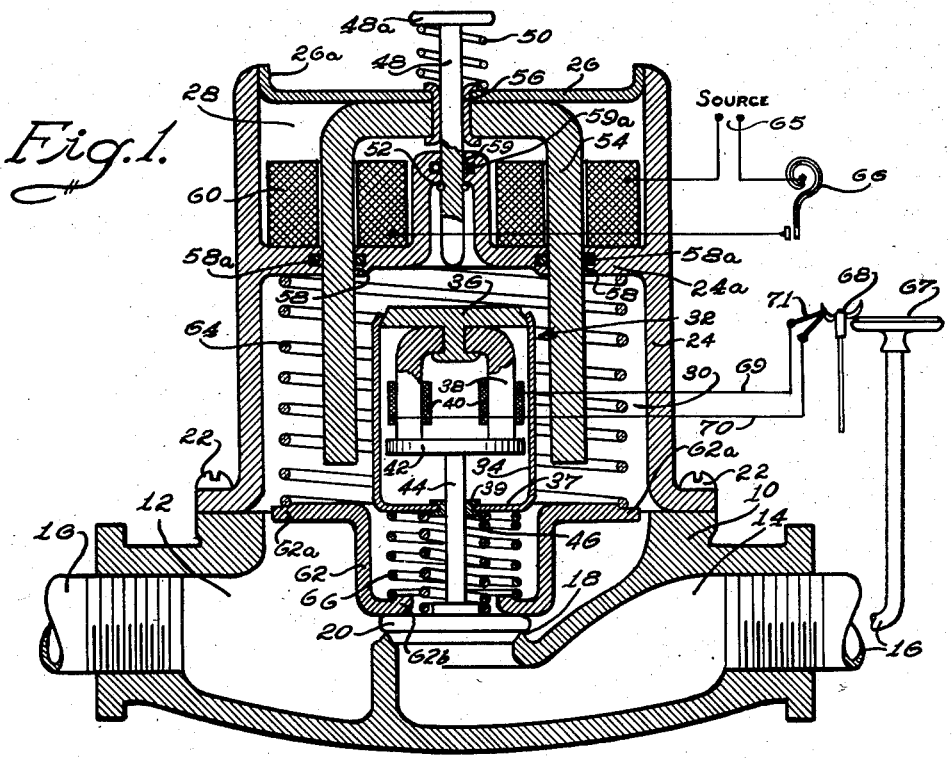

though any other source of electrical energy may be used without departing from the scope of the present invention.

United States Patent Office 2,873,069
Patented Feb. 10, 1959

2,873,069

FLOW CONTROL DEVICES

Russell B. Matthews, Wauwatosa, Wis., assignor to Baso Inc., Milwaukee, Wis., a corporation of Wisconsin Application April 22, 1955, Serial No. 503,312

5 Claims. (Cl. 236—1)

The present invention relates to improvements in flow control devices, and more particularly, to those devices for providing fluid fuel burning apparatus with both safety shut-off and thermostatic control.

Generally, separate and independently operable control devices have heretofore been used to provide both safety shut-off and thermostatic control of the fuel supplied to a single fuel burning apparatus. In order to eliminate shortcomings, such as increased cost and size of the resulting structure, which are inherent in utilizing several separate devices, the present invention is directed to providing a single device capable of affording both of the aforementioned control functions.

A primary object of the present invention, therefore, is to provide, in a single control device having a single flow control member, actuating means which is responsive to the ambient temperature of the space being heated and is also responsive to the occurrence of an unsafe condition, such as pilot flame extinguishment to thereby provide both thermostatic and safety shut-off control.

Another object of the present invention is to provide in a single control device of the character set forth, electromagnetic safety shut-off valve actuating means and electromagnetic condition responsive valve actuating means whereby both thermostatic control and safety shut-off is effected by electromagnetic actuating means in a single control device.

Another object is to provide a control device of the character described wherein the thermostatic control means employs an electromagnet and an armature therefor, said armature being permitted to respond to changes in the temperature being controlled, irrespective of the condition of the safety shut-off means, thus preventing injury to the thermostat electromagnetic structure by generation of excessive amounts of heat as would otherwise occur by continued energization of the electromagnet while retaining the armature in unattracted position.

A more specific object of the present invention is to provide a control device of the character set forth wherein the single flow control member can, during normal operation, be cycled by the thermostatic actuating mechanism, the safety shut-off actuating means being responsive to a predetermined dangerous condition, for example pilot burner outage, to overcall said thermostatic actuating means and effect movement of the flow control member to flow preventing position irrespective of the response of the thermostatic actuating means to the ambient temperature.

An even more specific object is to provide in a single flow control device of the class described, safety shut-off means having first and second movable members capable of being coupled in their attracted relation during existence of a pilot flame, thermostatic means including a stationary electromagnet and an armature therefor movable to said electromagnet upon occurrence of a given temperature condition, and spring means interconnecting said armature to one of said movable members to permit said armature to be attracted to said electromagnet irrespective of whether or not said first and second movable members are coupled in their attracted relation.

Another object is to provide a flow control device of the class described wherein the safety shut-off actuating means and the thermostatic actuating means are associated with the valve member so as to permit resetting of the safety shut-off means irrespective of the position of the thermostatic actuating means and without causing movement of such control means during such resetting.

The novel features which I consider characteristic of my invention are set forth with particularity in the appended claims. The device itself, however, both as to its organization and mode of operation, together with additional objects and advantages thereof, will best be understood from the following description of a specific embodiment when read in connection with the accompanying drawings, in which:

Figure 1 is a vertical sectional view of a control device embodying the present invention and showing the safety shut-off means in reset position and the electromagnetic thermostatic actuating means in its deenergized condition;

Figure 2 is a view similar to that of Figure 1 and illustrating resetting of the safety shut-off means while the electromagnetic thermostatic means is energized;

Figure 3:
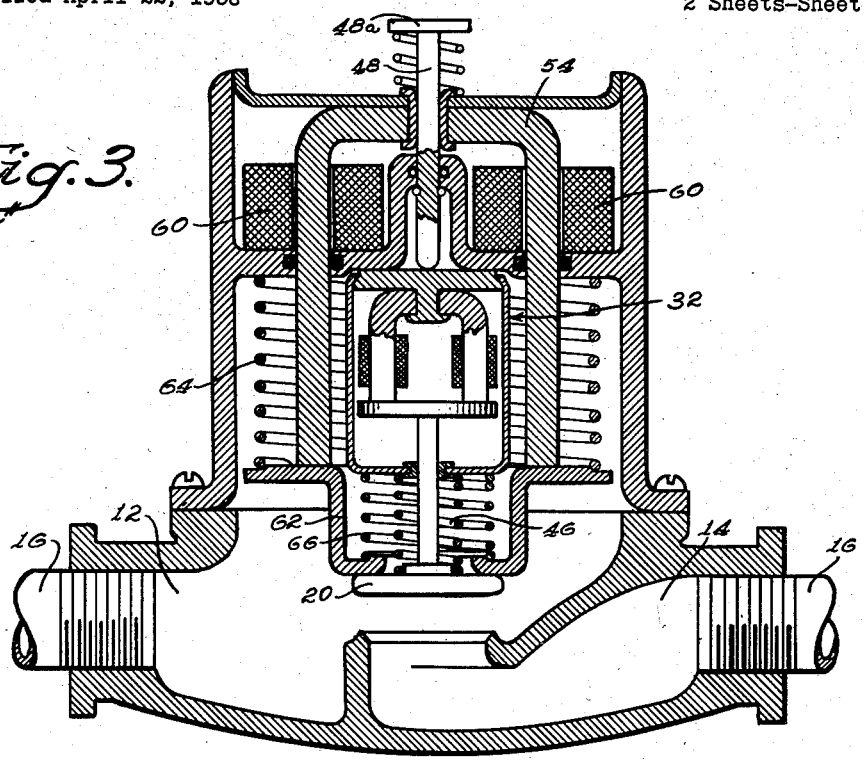
Figure 4:
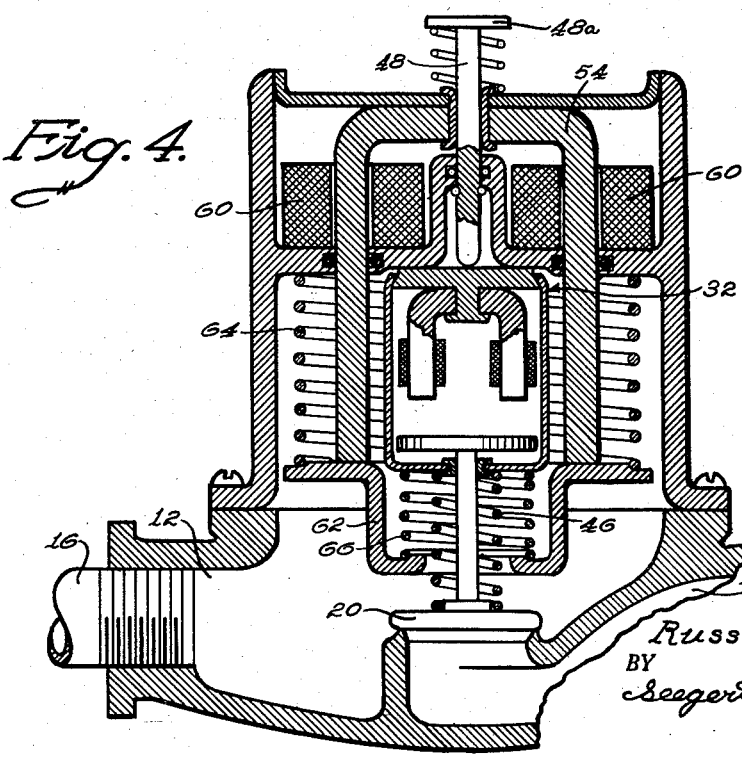

Figure 3 is similar to Figure 2 showing the flow control member in flow-permitting position following resetting of the safety shut-off means and energization of the thermostatic means; and Figure 4 is similar to Figure 3 showing the flow control member being held in flow-preventing position by response of the safety shut-off means to an unsafe condition while the thermostatic actuating means is energized.

Like reference characters indicate corresponding parts throughout the several figures of the drawings.

Referring to the drawings, numeral 10 designates a valve body formed with an inlet chamber 12 and an outlet chamber 14. Contiguous sections of a fuel supply conduit 16 are threadably fixed to valve body 10 in communication with each of chambers 12 and 14. The section of conduit 16 in communication with outlet chamber 14 may lead to a main burner 67 which may be ignited by a pilot burner 68 in a manner well known in the art. Fuel supply to the pilot burner is preferably afforded independently of conduit 16, or at least independently of the operation of the flow control device illustrating the present invention. Separating inlet chamber 12 and outlet chamber 14 is a partition formed with a valve seat 18 cooperable with a flow control member 20 for control of communication between said chambers and hence control of fuel flow to the burner.

Secured to valve body 10, by any well known means such as bolts 22, is a housing 24 wherein operating means for flow control member 20 are contained. A cover plate 26 closes the upper end of the housing 24 and is secured thereto in any well known manner, such as by welding, soldering or brazing a peripheral flange 26a of said cover plate to the upper end of said housing.

The housing 24 is formed with a transverse partition 24a which divides the interior of housing 24 into two enclosures or cavities, designated respectively 28 and 30. Disposed within cavity 30 is a hood assembly 32 comprising an enclosure 34 having an end wall 36 to which a U-shaped electromagnet core member 38 is rigidly secured. An electromagnet winding 40 is wound about the legs of the U-shaped core member 38 and has circuit connection means, for example conductors 69 and 70 affording connection of said winding 40 with a thermoelectric generator 71 positioned adjacent the pilot burner to be heated thereby in a manner well known in the art. The thermoelectric generator 71 is responsive to the heat of the flame of the pilot burner 68 to afford an energizing current for the winding 40, Positioned within enclosure 34 for movement between attracted and unattracted positions relative to electromagnet core member 38, is an armature member 42 fixed to one end of a valve stem 44 which extends through an opening in an end wall 37 of said enclosure; said end wall 37 retaining a grommet or bearing 39 in said opening to facilitate axial sliding movement of said stem. The flow control member 20 is pivotally fixed to the other end of valve stem 44, and interposed between said flow control member and the end wall 37 of enclosure 34 is a coiled compression spring 46 operable to bias the core member 38 and armature member 42 to their unattracted relative positions.

A reset stem 48 is formed with an enlarged end portion 48a and is slidably positioned within a tubular rivet-bearing 56 in the cover plate 26 as well as within a coaxial opening 59 formed in the partition 24a. A coiled compression spring 50 surrounds the reset stem 48 between cover plate 26 and the enlarged end portion 48a of said stem and biases said stem axially outwardly toward its normal position shown. To prevent removal of reset stem 48, I prefer to employ a snap ring 52 positioned within an annular groove therefor in said stem, said snap ring normally abutting the transverse partition wall 24a as shown in the drawings. I also prefer to employ an O-ring 59a disposed within a groove therefor in the aperture 59 and sealingly engaging the surface of the reset stem 48 to prevent escape of fluid fuel therealong.

Thermostatic actuating means is provided for flow control member 20 and comprises a U-shaped electromagnet core member 54 which is rigidly secured to the cover plate 26 by the rivet-bearing 56. The leg portions of U-shaped core member 54 extend through openings 58 formed in transverse partition wall 24a. I prefer to employ O-rings 58 disposed within grooves 58a therefor in the apertures 58, said rings sealingly engaging the legs of core member 54 to prevent escape of fluid fuel therealong.

Positioned within cavity 28 adjacent partition wall 24a and wound about the leg portions of core member 54, are electromagnet windings 60 connected in series circuit relation with each other and with a suitable source of electrical energy 65. Also in circuit with windings 60 and source 65 is a condition responsive switch, for example a thermostat 66, positioned in a space the temperature of which is to be controlled.

An armature member 62 which may be cup-shaped, is formed with outwardly extending flange portion 62a and inwardly extending flange portions 62b. The armature 62 is positioned as shown in the drawings for movement toward and away from the electromagnet core member 54. Interposed between flange portions 62a and partition wall 24a is a coiled compression spring 64 biasing said armature toward the flow control member 20, the flange 62b being engageable with said flow control member as shown to bias the latter toward the seat 18. Interposed between flange 62b and end wall 37 of enclosure 34 is a compression spring 66 biasing the hood 34 and the electromagnet frame 38 away from the armature member 62.

The operation of the subject device will now be described, reference being made to the several figures of the drawings:

A prerequisite to placing the subject invention in operation, is to ignite the pilot burner 68 for heating of the hot junction of the thermoelectric generator 72 and energization of the electromagnet winding 40 sufficient to retain the armature member 42 and core member 38 in attracted relative position when moved thereto against the bias of the spring 46. Following such energization of winding 40, depression of reset stem 48 causes enclosure 34 of hood assembly 32 to be moved against the bias of compression springs 46 and 66 to thereby position electromagnet core member 38 in attracted relative position with respect to armature member 42. Such positioning of armature member 42 permits the electromagnetic effect of winding 40 to couple core member 38 and armature member 42 in attracted relation due to passage of magnetic lines of force through said core member 38 and said armature member 42. The aforementioned resetting operation can be effected regardless of the position of said armature member 62 with respect to core member 54 and without causing movement thereof from one to another of its operating positions.

When the electromagnet winding 60 is in its unenergized condition so that compression spring 64 maintains armature member 62 in its retracted position as shown in Figure 1, the enclosure 34 can, by depression of the reset stem 48, be moved against the forces of compression springs 46 and 66 to effect the aforementioned resetting of the frame 38 to the armature 42. On release of the reset stem 48 the latter is retracted by the spring 50. The entire resetting operation is accomplished without causing movement of flow control member 20 to its flow-permitting position. This, of course, is due to exertion on flow control member 20 of the force of compression spring 64 through armature member 62.

Figure 2 of the drawings depicts resetting while armature member 62 is in its attracted position by virtue of energization of electromagnet winding 60 by current from the source 65. As shown therein, depression of reset stem 48 causes core member 38 to be moved to attracted relation with respect to armature member 42 without causing disturbance of armature member 62. More specifically, the force exerted on armature member 62 by compression spring 66 during such resetting movement is insufficient to overcome the attractive force between core member 54 and armature member 62 afforded by energization of electromagnet windings 60. Retraction of reset stem 48 from its position shown in Figure 2, causes hood assembly 32, including core member 38 and the armature member 42 coupled thereto to be moved to retracted position and flow control member 20 to be moved to its flow-permitting position shown in Figure 3. Fluid fuel is now permitted to flow to the main burner and, on emission therefrom, is ignited by the pilot burner, thus placing the fuel burning apparatus in operating condition.

Again referring to Figure 1 of the drawings, it is seen that on release of reset stem 48 the flow control member 20 does not move to flow-permitting position unless or until the electromagnet windings 60 are energized, at which time the entire hood assembly 32, including enclosure 34, and electromagnet member 38 and armature 42 are moved as a unit to position the flow control member 20 in its flow-permitting position. On subsequent deenergization of electromagnet windings 60, for example by interruption of the current flow thereto by the thermostat 66, the compression spring 64 returns the armature member 62, flow control member 20 and the entire hood assembly 32 to the position shown in Figure 1, thus terminating fuel flow to the main burner in response to a predetermined temperature within the space being controlled.

Upon extinguishment of the flame of the pilot burner, the thermoelectric generator 71 is cooled by the surrounding atmosphere to a point where electromagnet winding 38 is insufficiently energized to any longer overcome the force of compression spring 46, whereupon core member 38 and armature member 42 are caused by the spring 46 to be positioned in separated relation, said spring biasing the end wall 36 of enclosure 34 into abutment with the partition 24a and the flow control member 20 to its flow-preventing position as shown in Figure 4. Such separation of core member 38 and armature member 42 and actuation of the flow control member 20 occurs upon extinguishment of the flame of the pilot burner regardless of the position of armature member 62 and without causing movement or disturbance of said armature member 62.

It will be noted that a lost motion connection is afforded which permits the armature member 62 to be moved to its attracted relative position with respect to core member 54 regardless of whether or not electromagnet members 38 and 42 are in attracted relation. This affords protection to the thermostatic electromagnetic structure in that continuous energization of an electromagnet winding while the armature therefor is prevented from moving to its attracted position with respect thereto, generates an excessive amount of heat which may break down the insulation and cause shorting of the turns of wire in the electromagnet winding.

It is thus seen that the present invention provides a unitary compact control device having a single flow control member capable of affording both safety shut-off and thermostatic control, and wherein the thermostatically responsive armature member is always permitted to respond to the thermostatic actuating means to afford protection of the thermostat electromagnetic structure. Further, such invention provides a device wherein the safety shut-off mechanism can overcall the thermostatic actuating mechanism for disposition of the single flow control member in flow-preventing position irrespective of the response of the thermostatic actuating mechanism to the ambient temperature.

Although I have shown and described certain specific embodiments of my invention, I am fully aware that many modifications thereof are possible. My invention, therefore, is not to be restricted except insofar as is necessitated by the prior art and by the spirit of the appended claims.

What is claimed as the invention is:

1. In a fluid flow control device, in combination, a flow control member movable between controlling positions, operating means for said flow control member comprising, a first movable member operatively associated with said flow control member for movement thereof between its said controlling positions, a second movable member having attracted and unattracted relative positions with respect to said first movable member, means biasing said first and second movable members to separated relation and hence said flow control member to one of its controlling positions, means for resetting said movable members to attracted relation against said bias, means for coupling said first and second movable members when in said attracted relation, condition responsive means including an actuator movable from a first position to a second position in response to a given condition, and connection means operatively associated with said actuator and said movable members for effecting, by coupling of said movable members, movement of said movable members and said flow control member with said actuator whereby, when said movable members are coupled, said flow control member is moved from said one to another of its controlling positions by movement of said actuator from its first to its second position, said biasing means and said connection means, on release of said coupling means, rendering said actuator incapable of moving either of said movable members and hence said flow control member even though said actuator is permitted to move from its first to its second position in response to said given condition.

2. In a fluid flow control device, in combination, a flow control member movable between controlling positions, operating means for said flow control member comprising, a first movable member operatively associated with said flow control member for movement thereof between its said controlling positions, a second movable member having attracted and unattracted relative positions with respect to said first movable member, means biasing said first and second movable members to separated relation and hence said flow control member to one of its controlling positions, means for resetting said movable members to attracted relation against said bias, means for coupling said first and second movable members when in said attracted relation, condition responsive means including an actuator movable from a first position to a second position in response to a given condition, and connection means between said actuator and said second movable member for effecting, by coupling of said movable members, movement of said movable members and said flow control member with said actuator whereby, when said movable members are coupled, said flow control member is moved from its said one to another of its controlling positions by movement of said actuator from its first to its second position and permitting said resetting movement irrespective of the position of said actuator and without causing movement thereof.

3. In a fluid flow control device, in combination, a flow control member movable between controlling positions, operating means for said flow control member comprising, a first movable member fixed to said flow control member to provide a unitary structure whereby movement of said movable member affords movement of said flow control member from one to another of its controlling positions, a second movable member having attracted and unattracted relative positions with respect to said first movable member, means biasing said first and second movable members to separated relation and hence said flow control member to said one of its controlling positions, means for effecting resetting of said movable members to their said attracted relative positions, means for electromagnetically coupling said first and second movable members when in said attracted relation, condition responsive means including an electromagnet and an armature therefor, said electromagnet being energizable in response to occurrence of a given condition to attract said armature from a first position to a second position, and connection means between said armature and said second movable member for effecting, by coupling of said movable members, movement of said movable members and said flow control member with said actuator whereby, when said movable members are coupled, said flow control member is moved from its said one to another of its controlling positions by movement of said actuator from its first to its second position and permitting said resetting movement of said second movable member irrespective of the position of said actuator and without causing movement thereof.

4. In a fluid flow control device, in combination, a flow control member movable between controlling positions, operating means for said flow control member comprising, condition responsive electromagnetic means including a stationary U-shaped magnet frame and an energizing winding wound about one of the leg portions of said frame, said electromagnetic means also including an armature member for said magnet frame movable from a retracted to an attracted position with respect to said frame in response to energization of said winding, safety shut-off means for said flow control member positioned between the leg portions of said U-shaped magnet and including a first movable magnetic member operatively associated with said flow control member for movement thereof between its said controlling positions, a second movable magnetic member having attracted and unattracted relative positions with respect to said first movable magnetic member, means biasing said first and second movable magnetic members to separated relation and hence said flow control member to one of its controlling positions, means for resetting said movable magnetic members to attracted relation against said bias, an energizing winding on one of said magnetic members for electromagnetically coupling said magnet members when in said attracted relation, and connection means operatively associated with said armature member and said magnetic members for effecting, by coupling of said movable magnetic members, movement of said magnetic members and said flow control member with said armature member, whereby, when said magnetic members are coupled, said flow control member is moved from said one to another of its controlling positions by movement of said armature member from its retracted to its attracted position, said biasing means, on release of said coupling means, causing return of said first and second movable magnetic members to separated relation and disposition of said flow control member in its said one controlling position.

5. In a fluid flow control device, in combination, a flow control member movable between controlling positions, operating means for said flow control member comprising, a first movable member operatively associated with said flow control member for movement thereof between its said controlling positions, a second movable member having attracted and unattracted relative positions with respect to said first movable member, means biasing said first and second movable members to separated relation and hence said flow control member to one of its controlling positions, means for coupling said first and second movable members when in attracted relation, condition responsive means including an actuator movable from a first position to a second position in response to a given condition, means independent of said condition responsive means for resetting said movable members to attracted relation against said bias, and connection means operatively associated with said actuator and said movable members for effecting, by coupling of said movable members, movement of said movable members and said flow control member with said actuator whereby, when said movable members are coupled, said flow control member is moved from said one to another of its controlling positions by movement of said actuator from its first to its second position, said biasing means, on release of said coupling means, causing return of said first and second movable members to separated relation and disposition of said flow control member in its said one controlling position.

References Cited in the file of this patent
UNITED STATES PATENTS

| Re. 21,977 | Hotchkiss | Dec. 16, 1941 |
| 2,227,447 | Fisher | Jan. 7, 1941 |
| 2,245,773 | Grant | June 17, 1941 |